Figure 1:
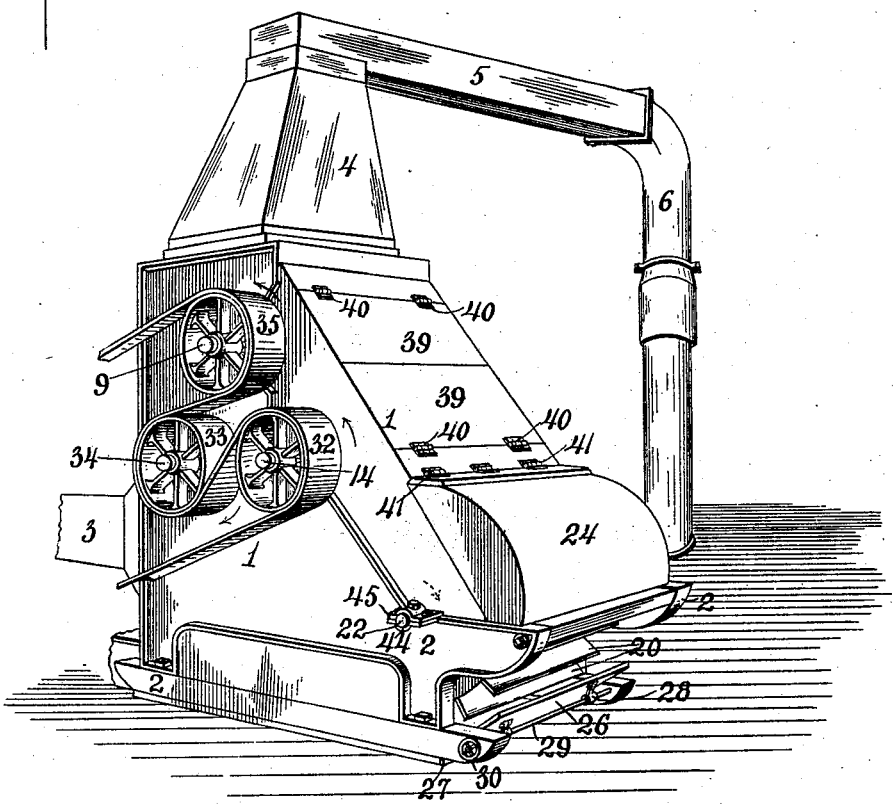

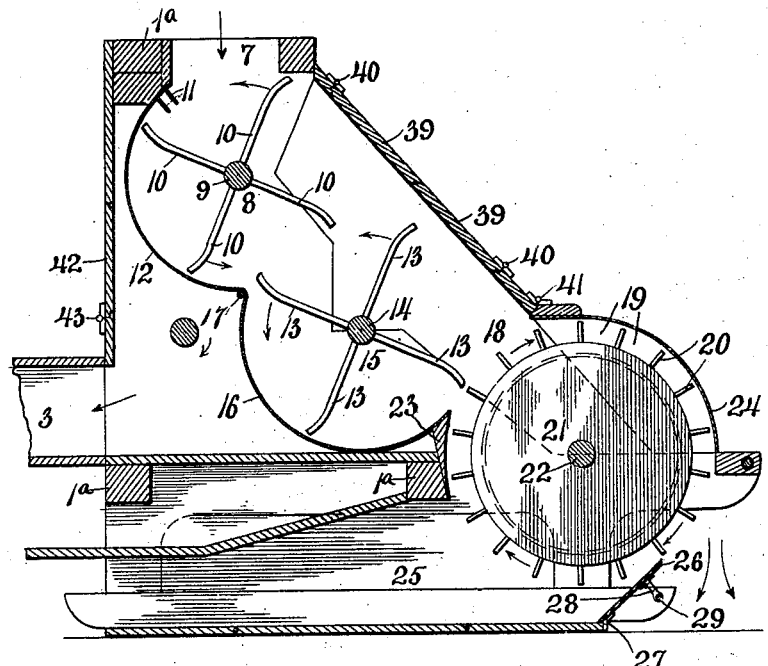
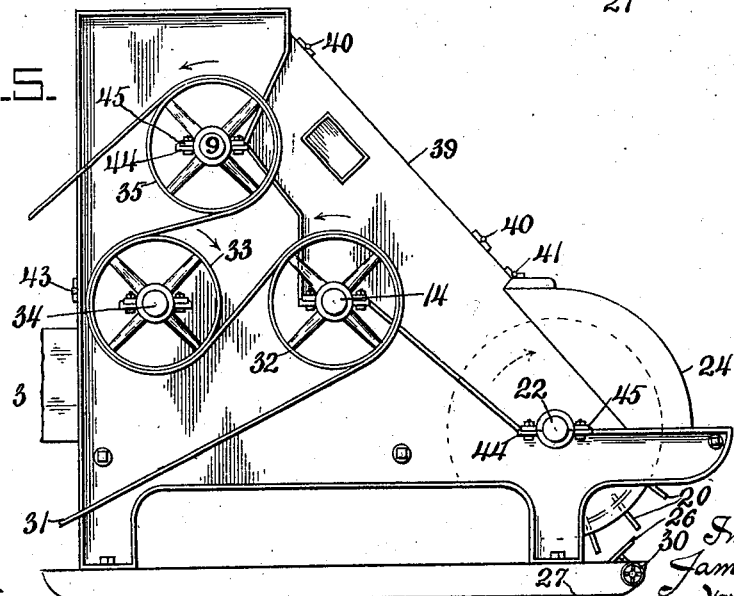

No. 690,614. Patented Jan. 7, 1902.
J. T., W. R. & G. B. RODGERS.
COTTON CLEANER.
(Application filed Dec. 30, 1899.)
(No Model.) 3 Sheets—Sheet 3.
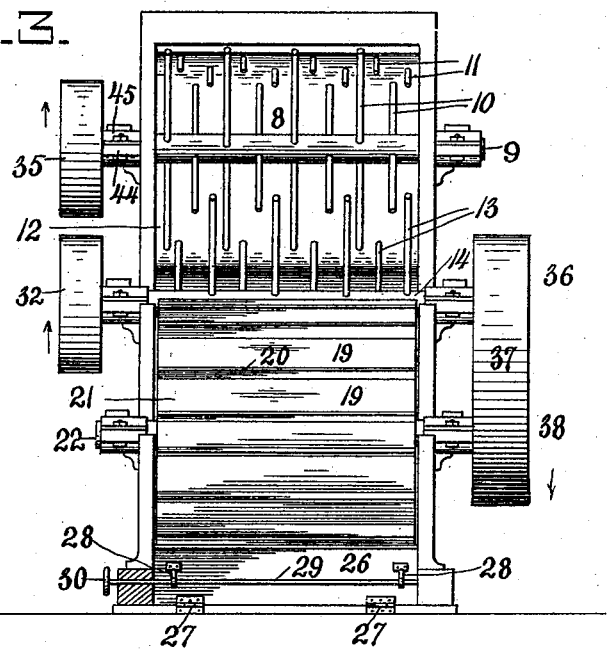
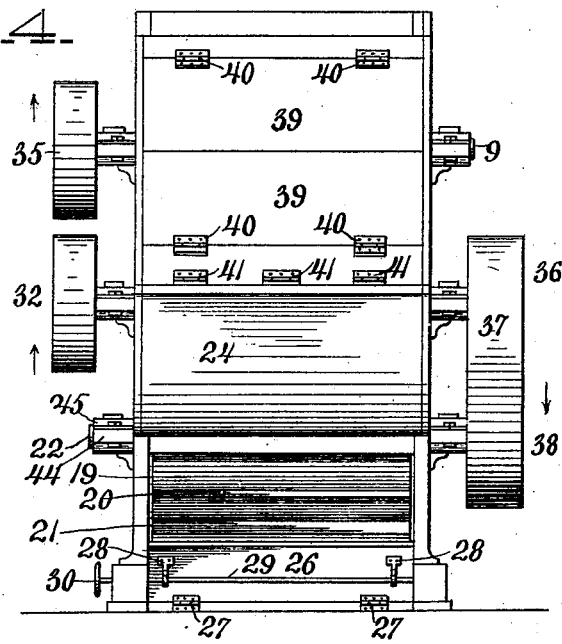
WITNESSES
INVENTORS.
James T. Rodgers
William R. Rodgers
George B. Rodgers
By Knight Bros
Attorneys.

UNITED STATES PATENT OFFICE.

JAMES T. RODGERS, WILLIAM R. RODGERS, AND GEORGE B. RODGERS, OF MEMPHIS, TENNESSEE.

COTTON-CLEANER.

SPECIFICATION forming part of Letters Patent No. 690,614, dated January 7, 1902.

Application filed December 30, 1899. Serial No. 742,118. (No model.)

*To all whom it may concern:*

Be it known that we, JAMES T. RODGERS, WILLIAM R. RODGERS, and GEORGE B. RODGERS, citizens of the United States, residing at Memphis, in the county of Shelby and State of Tennessee, have invented certain new and useful Improvements in Cotton-Cleaners, of which the following is a specification.

Our invention relates to a machine that will treat cotton to break the unopened bolls, disintegrate clods or lumps formed by dirt, burs, or other trash that becomes mingled with the cotton, and thoroughly separate all foreign substances of fine or coarse dimensions from the cotton and discharge the separated material in separate places.

Our invention involves the use of a substantially air-tight casing to which cotton to be cleaned is delivered by pneumatic suction through said casing, a pair of opposed beaters having oppositely-moving beating-arms by which all the foreign substances are loosened from the staple and rotating in concentric concave screens through which the foreign substances of finer grade are drawn, and a separating and discharging drum to which the beaters deliver, located at the tailing end of the machine and provided with radial flights forming pockets to receive the material and which, together with said material, provide a substantially air-tight closure for the tailing-outlet, said drum dipping into a trash-flue which terminates in an adjustable cant-board just short of the line of discharge from the drum and the flights serving the additional purpose of creating an air-current over said cant-board into the trash-flue to draw thereinto such trash as though fully separated by the beaters is too coarse to pass through the concave screens, but passes with the staple to the tailing-outlet, the adjustability of the cant-board permitting regulation of the separation to a nicety.

Our invention consists in the novel features or combinations of features of the machine above outlined, as well as novel details of construction incident thereto, which are specifically pointed out in the claims.

In the accompanying drawings, forming part of this specification, Figure 1 represents by perspective view our improved machine, having the suction-flue broken away and having a common form of pneumatic elevating and feeding tube applied. Fig. 2 is a vertical longitudinal section through the machine, the suction and feeding connections being omitted. Figs. 3 and 4 are plan views of the same, the former having the front of the casing removed. Fig. 5 is a side view showing the arrangement of the driving-belting.

Referring to Fig. 1, it will be seen that the machine comprises a casing 1, erected upon the side frames 2 and connected with a rear suction-flue 3, leading to any suitable means for exhausting air and by which a suction is created through the machine. The casing is substantially air-tight, so that the machine may be fed pneumatically through the spreading-cap 4 from the common form of valved pipe 5 and telescope 6 or similar connections.

Referring to Figs. 2 and 3, 7 represents the feed-opening, through which material to be treated is fed directly onto the rapidly-rotating beater 8, composed of a through-shaft 9 and radial arms 10, having backwardly-curved outer ends. The material is driven by the outer portions of said arms past the comb 11, by which the clods, lumps, and hulls are broken and partly disintegrated, thence over the upper concave screen 12, where the particles of trash are driven by the air-current and by centrifugal action outward against the screen, and if of small dimensions through said screen to the exhaust-flue, and thence off the lower end of screen 12 and outward, where it is caught by the oppositely-moving arms 13, rotating with the shaft 14 of the lower beater 15, by which the material is thrown back upon another screen 16, where still further particles escape with the air-current. By the contrary action of the opposed sides of the beaters the material is picked, turned, and lightened up, so that the foreign substances become thoroughly detached therefrom and allowed to find their way to the screen, and all parts that can pass through the screens are thus permitted to escape.

The screens 12 and 16 may be made of woven wire; but we find in practice that a screen made of fourteen or sixteen gage sheet-steel having oblong perforations five thirty-seconds by three-fourths inches and with the longer dimension running transversely of the machine and the perforations arranged in alternating or staggered positions serves the purpose best. Said screens may be made of a continuous piece of material secured at its upper and lower edges to suitable fixed parts and formed into two concaves by the position of its intermediate support and division bar 17, Fig. 2.

From the lower screen 16 the material is thrown by beater 15 outward over the tailing-outlet 18, where it settles into the pockets 19, formed by flights 20 on the discharging and separating drum 21, to which rapid revolution is imparted through its shaft 22. The drum 21 makes substantially air-tight connection at its inner side with the wall 23 and on its outer side with the shield 24, so that the suction from the feed-opening through the casing and past the screens is not materially interfered with, the material in the pockets making a complete closure on the outer side.

There usually exists in cotton, and especially in the later portion of the crop, a large proportion of unmatured bolls, commonly called "cracked bolls," which contain good cotton, but the hulls of which have a tough fibrous inner lining that prevents them from disintegrating sufficiently to pass through the screens. These parts of hulls, as well as larger pieces of leaf, trash, &c., remain with the staple and enter the discharging and separating drum. During their passage around this drum the cotton is heavier, as the seed is not removed, than the foreign substances and finds its way to the outside, so that the foreign substances named settle to the bottom of the pockets. This enables us to thoroughly separate these parts by the following means:

25 is a trash-flue into which the discharging and separating drum dips and the bottom of which terminates at front in a cant-board 26, hinged at 27 and rendered adjustable to and from the periphery of the drum through the medium of suitable means—such, for instance, as the toggle-links 28 and shaft 29, the latter being rotatable through a hand-wheel 30, Figs. 3, 4, and 5. By the construction of the flighted drum an air-current is set up over the cant-board into the flue, which may be more or less intensified by the adjustment of the cant-board to and from the drum. Such adjustment also may be made to define accurately the plane of division between the material deflected by the air-current and that continuing in the line of discharge, and thus insure a complete separation of the trash from the cotton.

The machine may be conveniently driven by a belt 31 from any suitable source of power, which belt preferably passes over a pulley 32 on the shaft 14 of the lower beater, thence around tightening-pulley 33, fixed on shaft 34, and thence over pulley 35 on upper beater-shaft 9. The shaft 34 passes through the machine and upon its opposite end carries a pulley 36, connected by short belt 37 with pulley 38 on the drum-shaft 22. By this means all of the rotating parts are driven. All of the shafts are preferably driven at the same speed. It will be observed, however, that the lengths of the beater-arms in the lower beater are longer than those of the upper beater, and the extreme diameter of the discharge-drum is greater than that of the lower beater, measuring to the extremities of the arms. The result is that the material is driven constantly faster as it passes through the machine, and as the revolution of the upper beater practically controls the admission of material it will be observed that it is impossible to choke the machine or overcrowd it, as the material is accelerated after leaving the upper drum. We find in practice that about five hundred revolutions per minute give the best results.

The machine is preferably built upon two main cast-metal side frames 1 and housed in, the front of the casing being preferably made in hinging sections 39, hinging at 40, the shield 24 being also hinged, as at 41, and the back being provided with a panel 42, hinging at 43. The cast-metal frames afford support for the cross-timbers 1ª, and upon these the wooden housing, flue-walls, &c., are directly mounted. The shaft-bearings 44 are all cast integrally on the side frames and the upper portions 45 of said bearings bolted thereto.

A cotton-cleaning machine constructed as above described is found in practice to facilitate the operation and lessen the expense of cleaning cotton and puts the cotton in a perfectly-clean condition, so that its value is enhanced not only to the producer, but also to the spinner.

Having thus described our invention, what we claim as new therein, and desire to secure by Letters Patent, is—

1. In a cotton-cleaner, the combination of a pneumatic feed-pipe, an air-tight casing through which an air-current is set up, provided with a feed-opening with which the pneumatic feed-pipe is connected, beaters, one above the other and the screens toward which the respective beaters revolve, so that the opposed arms of the two beaters move in opposite directions, means whereby an air-current may be set up through both screens, a trash-flue and a suitable cotton-discharge, for discharging the cotton in another direction than through the trash-flue, cutting off the admission of air through the discharge-opening.

2. In a cotton-cleaner, the combination of a suitable casing containing means for detaching foreign substances from the cotton, and provided with a tailing-opening, a drum located at said tailing-opening and provided with radial longitudinal flights by which material is received and discharged from the casing, a trash-flue into which the drum dips, terminating in a cant-board adjacent the periphery of the drum and to the point at which said drum discharges material, whereby the flights produce a current of air into the trash-flue, for the purpose set forth.

3. In a cotton-cleaner, the combination of the casing containing a beater, the discharging and separating drum located at the tailing-opening of the casing and provided with radial longitudinal flights, and the trash-flue located beneath the drum and terminating at its forward end, near the discharge-point of the drum, in an adjustable cant-board 26; substantially as and for the purpose set forth.

JAMES T. RODGERS.
WILLIAM R. RODGERS.
GEORGE B. RODGERS.

Witnesses:
PERCY C. CLARKE,
JAMES LEE, Jr.